United States Patent [19]
Dinsley et al.

[11] Patent Number: 5,971,425
[45] Date of Patent: Oct. 26, 1999

[54] SUSPENSION SYSTEM FOR A LOAD CARRYING MACHINE

[75] Inventors: Brian Dinsley, Hartlepool; Terence Fairless, Co. Durham; John Hufford, Middlesbrough; Anthony J. Pollock, Cleveland, all of United Kingdom

[73] Assignee: Caterpillar Inc., Peoria, Ill.

[21] Appl. No.: 09/104,501

[22] Filed: Jun. 25, 1998

Related U.S. Application Data

[60] Provisional application No. 60/053,420, Jul. 22, 1997.

[51] Int. Cl.⁶ ..................................................... B60G 5/00
[52] U.S. Cl. ..................................... 280/678; 280/124.128
[58] Field of Search .................................... 280/677, 678, 280/681, 687, 124.109, 124.128, 124.153

[56] References Cited

U.S. PATENT DOCUMENTS

| | | | |
|---|---|---|---|
| 2,874,973 | 2/1959 | Botkin | 280/678 |
| 3,315,979 | 4/1967 | Chalmers | 280/678 |
| 3,471,165 | 10/1969 | Raidel . | |
| 3,528,680 | 9/1970 | Nelson . | |
| 3,726,540 | 4/1973 | Grooss | 280/678 |
| 4,202,564 | 5/1980 | Strader | 280/678 |
| 4,324,417 | 4/1982 | Johansson | 280/678 |
| 4,459,918 | 7/1984 | Stef | 105/157 |

FOREIGN PATENT DOCUMENTS

| | | |
|---|---|---|
| 1327204A | 8/1963 | France . |
| 2800826 | 7/1978 | Germany . |

*Primary Examiner*—Paul N. Dickson
*Assistant Examiner*—Lynda Jasmin
*Attorney, Agent, or Firm*—Alan J. Hickman

[57] ABSTRACT

A suspension system is provided for a load carrying body of a load carrying machine. The suspension system includes a longitudinal frame, first and second axle assemblies, first and second suspension members, first and second balance beams, a first pair of flexible members, and a second pair of flexible members. The first pair of flexible members, and the second pair of flexible members are connected in the system at a predetermined location at which shear is reduced and service life is increased.

8 Claims, 5 Drawing Sheets

Fig_5_
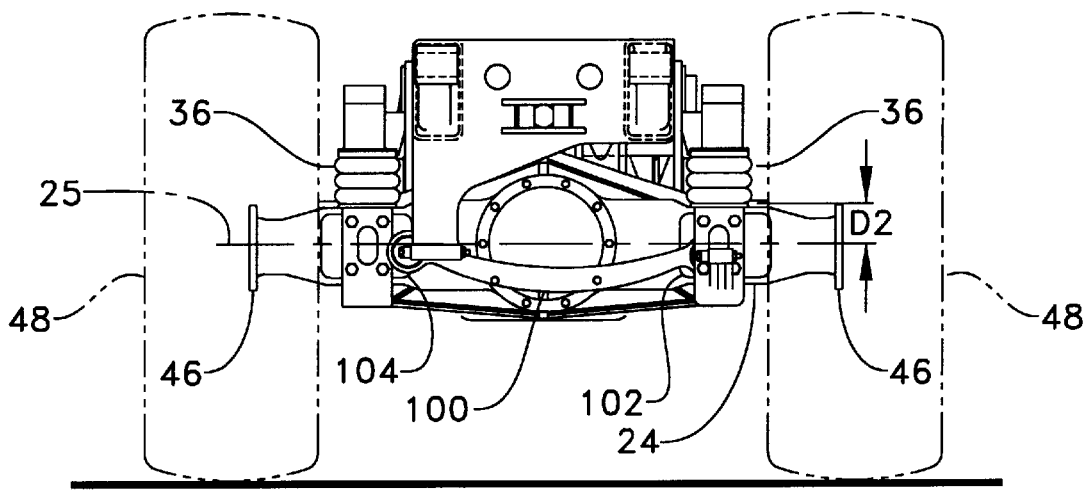
Fig_6_
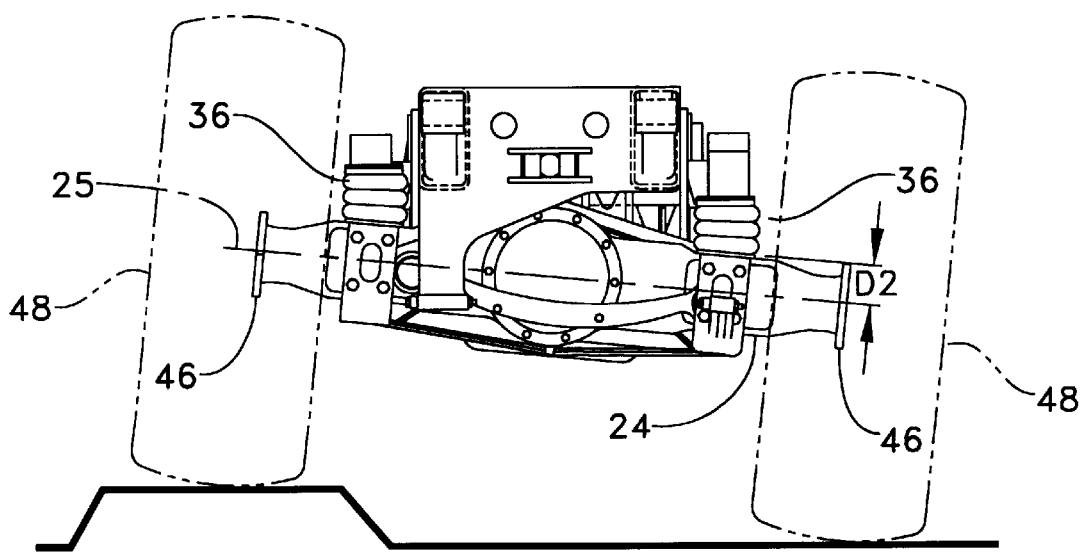

SUSPENSION SYSTEM FOR A LOAD CARRYING MACHINE

This application claims the benefit of prior provisional patent application Ser. No. 60/053,420 filed Jul. 22, 1997.

TECHNICAL FIELD

This invention relates to a suspension system for a machine and more specifically to a suspension system for a tandem axle load carrying machine.

BACKGROUND ART

Dump trucks and off highway trucks are designed to carry heavy loads and often are required to work in areas of uneven grade. Suspension systems for these machines need to be robust and capable of supporting these loads while withstanding forces due to shifting loads during normal operation. In the case of tandem axle machines the suspension components need to allow for pitch and roll of each axle while overcoming obstacles and still maintain balance of the load. To reduce such shear stresses in suspension components it is important that proper placement of these components are optimized.

The present invention is directed to overcome one or more of the problems as set forth above.

DISCLOSURE OF THE INVENTION

In one aspect of the present invention, a suspension system for a load carrying machine having a frame is provided. First and second longitudinally spaced apart axle assemblies, each having opposite end portions, are positioned transversely relative to the frame. A first suspension member having a first end portion and a second end portion is pivotally connected at the first end portion to the frame at a predetermined location. The second end portion of the first suspension member is secured to the first axle assembly at a predetermined location. A second suspension member having a first end portion and a second end portion is pivotally connected at the first end portion to the frame at a predetermined location. The second end portion of the second suspension member is secured to the second axle assembly at a predetermined location. First and second balance beams each having first and second end portions, and a middle portion, are pivotally connected to the frame at predetermined locations between first and second end portions of the balance beams. The pivotal location of the first end portion of the second suspension member and the predetermined pivotal locations of the balance beams are each generally along a common axis. The axis extends transversely relative to the frame. A pair of first flexible members are positioned between and connected to the first axle assembly and the first end portion of the balance beam. A pair of second flexible members are positioned between and connected to the second axle assembly and the second end portion of the balance beam.

BRIEF DESCRIPTION OF THE DRAWINGS

FIG. 5 is a diagrammatic rear view taken along lines 5—5 of the embodiment shown in FIG. 1; and FIG. 6 is the rear view of FIG. 5 showing the axle assembly as one wheel traverses an obstacle.

BEST MODE FOR CARRYING OUT THE INVENTION

Figure 1:
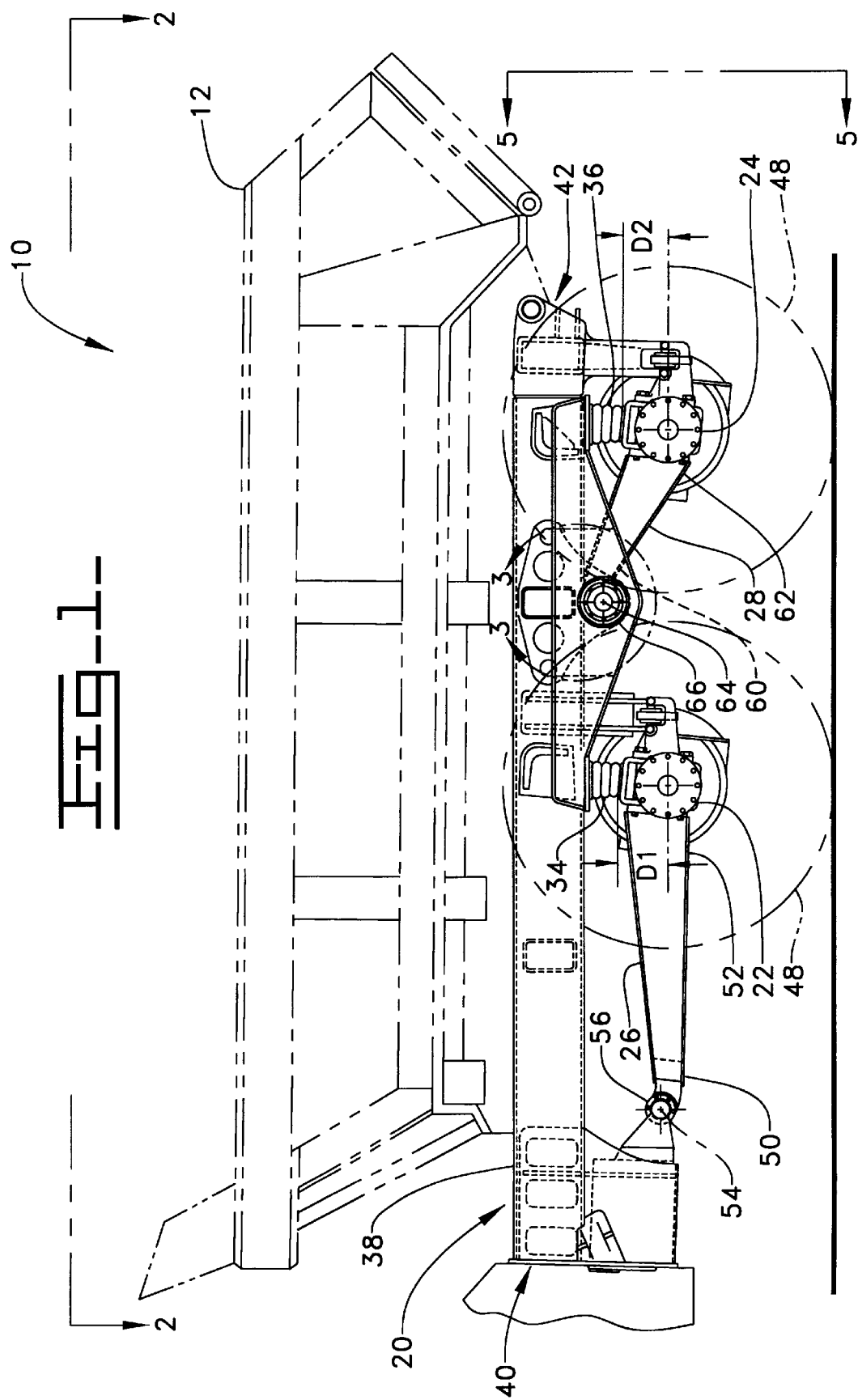
FIG. 1 is a diagrammatic longitudinal side view of an embodiment of the present invention showing, a suspension system of a load carrying machine with the load carrying body and wheels shown in phantom for clarity.
Figure 2:
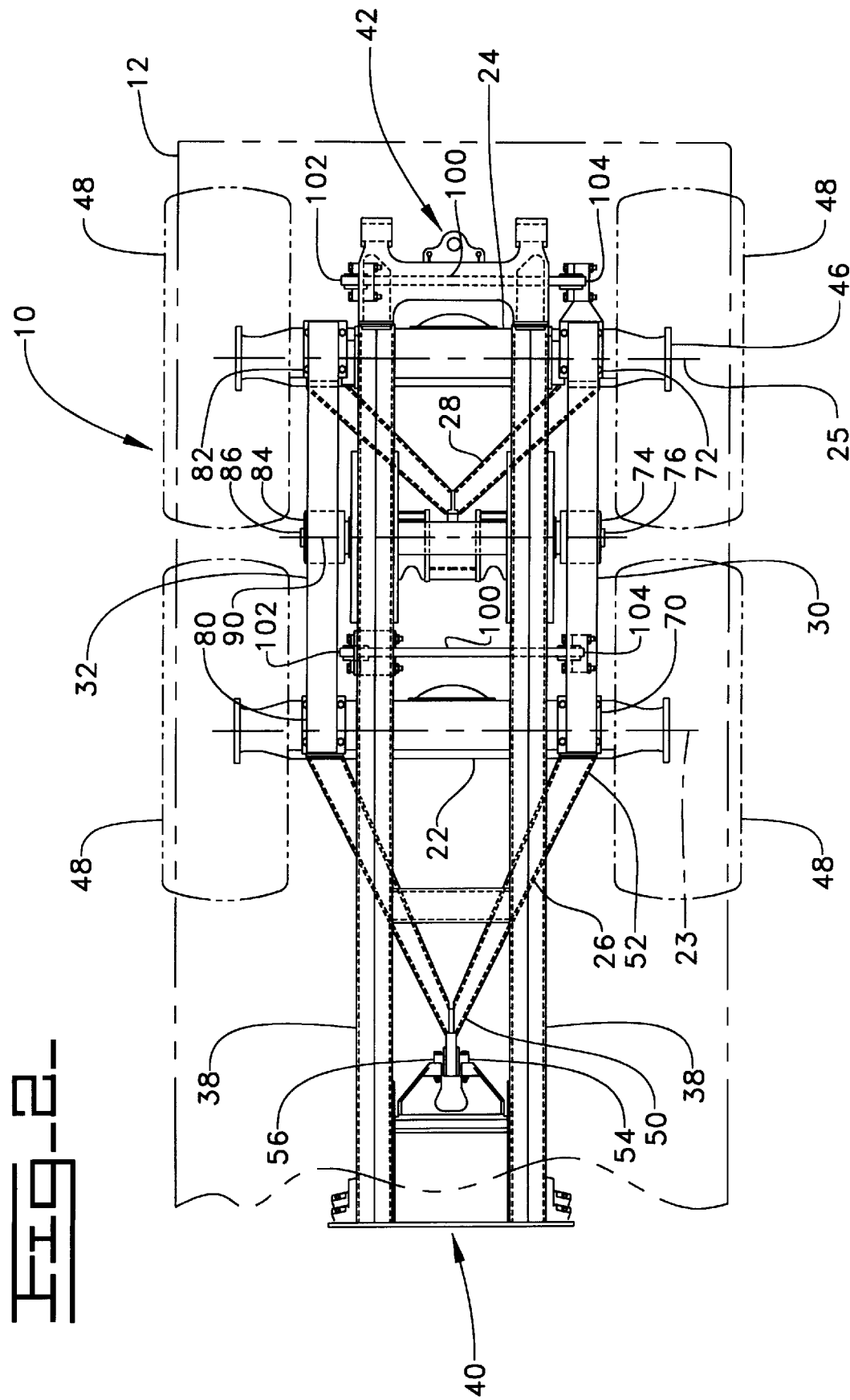
FIG. 2 is diagrammatic plan view taken along lines 2—2 of the embodiment shown in FIG. 1.

With reference to the drawings and in particular to FIGS. 1 and 2, a suspension system 10 is shown for a load carrying body 12 of a load carrying machine 14 (not shown), for example an off highway articulating dump truck. The suspension system 10 includes a longitudinal frame 20, first and second axle assemblies 22,24, first and second suspension members 26,28, first and second balance beams 30,32, a first pair of flexible members 34, and a second pair of flexible members 36.

The longitudinal frame 20 consists of two box beam sides 38 and includes a first end portion 40 and a second end portion 42.

The first and second axle assemblies 22,24 are longitudinally spaced apart and disposed beneath the box beam sides 38 of the frame 20 at the second end portion 42. Each of the first and second axle assemblies 22,24 define an axis 23,25 and have opposite end portions 46 that are positioned transversely relative to the frame 20. Wheels 48 are mounted to the opposite end portions 46 of the first and second axle assemblies 22,24.

The first suspension member 26 has a first end portion 50 and a second bifurcated end portion 52. The first end portion 50 is pivotally connected to the first end portion 40 of the frame 20 at a predetermined location 54 beneath the box beam sides 38. The pivotal connection is preferably a universal type connection 56, but could be a spherical or ball joint type connection or any or configuration that allows for two axis movement. The second end portion 52 is secured to the opposite end potions 46 of the first axle assembly 22.

The second suspension member 28 has a first end portion 60 and a second bifurcated end portion 62. The first end portion 60 is pivotally connected to the frame 20 at a predetermined location 64. The pivotal connection is preferably a universal type connection 66, but could be a spherical or ball joint type connection or any configuration that allows for two axis movement. The second end portion 62 is secured to the opposite end potions 46 of the second axle assembly 24.

The first balance beam 30 has a first end portion 70, a second end portion 72, and a middle portion 74. The first balance beam 30 is pivotally connected to one side of the frame 20 beneath the box beams 38 at a predetermined location 76 between the first end portion 70 and the second end portion 72.

The second balance beam 32 has a first end portion 80, a second end portion 82, and a middle portion 84. The second balance beams 32 is pivotally connected to the other side of the frame 20 beneath the box beams 38 at a predetermined location 86 between the first end portion 80 and the second end portion 82.

The predetermined locations 76,86 create a common axis 90 extending transversely relative to the frame 20. The predetermined location 64 that the second suspension member 28 is pivotally connected to the frame 20 is generally on common axis 90.

Figure 3:
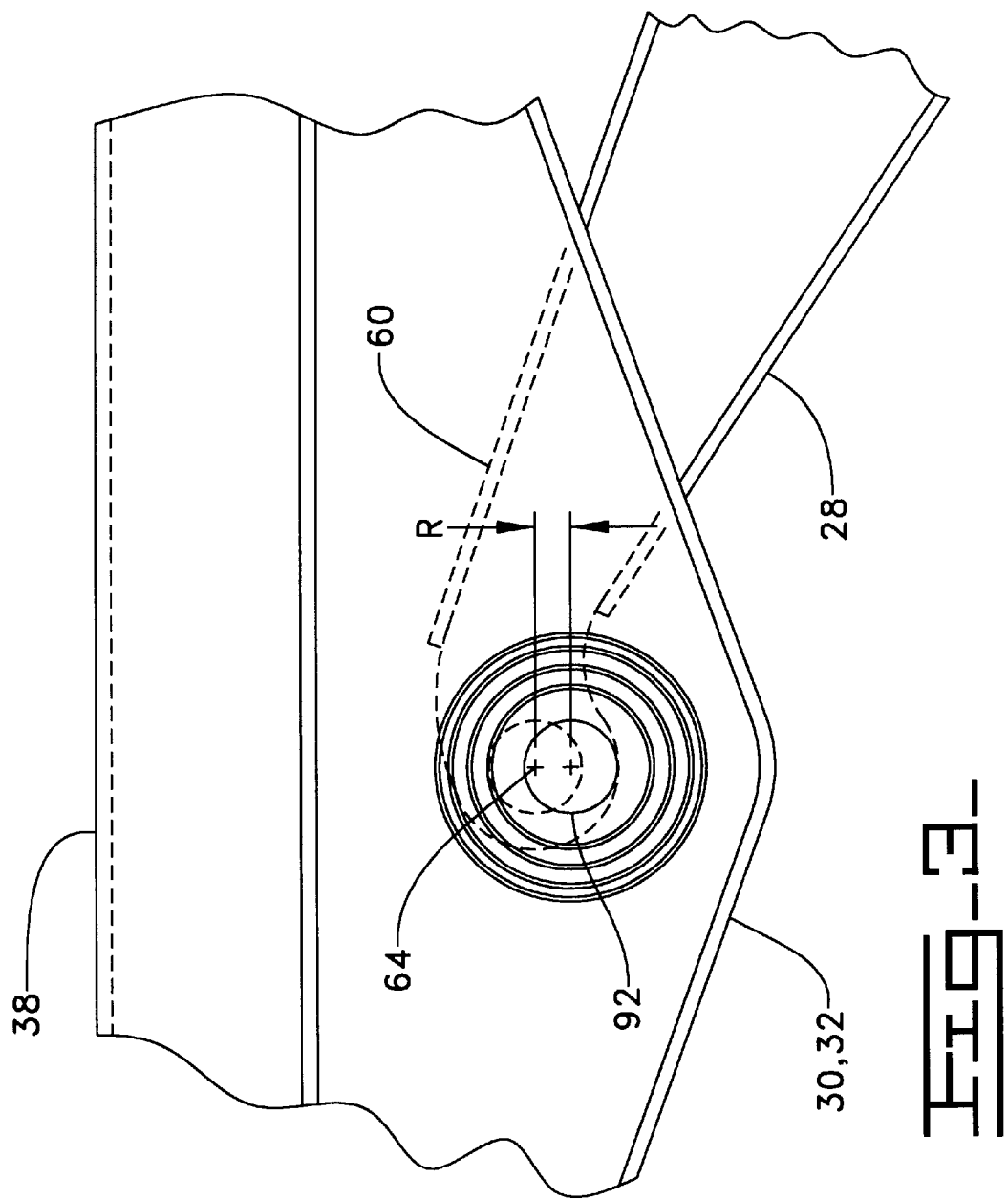
FIG. 3 is an enlarged view of the connection point of the balance beam shown at line 3 of the embodiment in FIG. 1.
Figure 4:
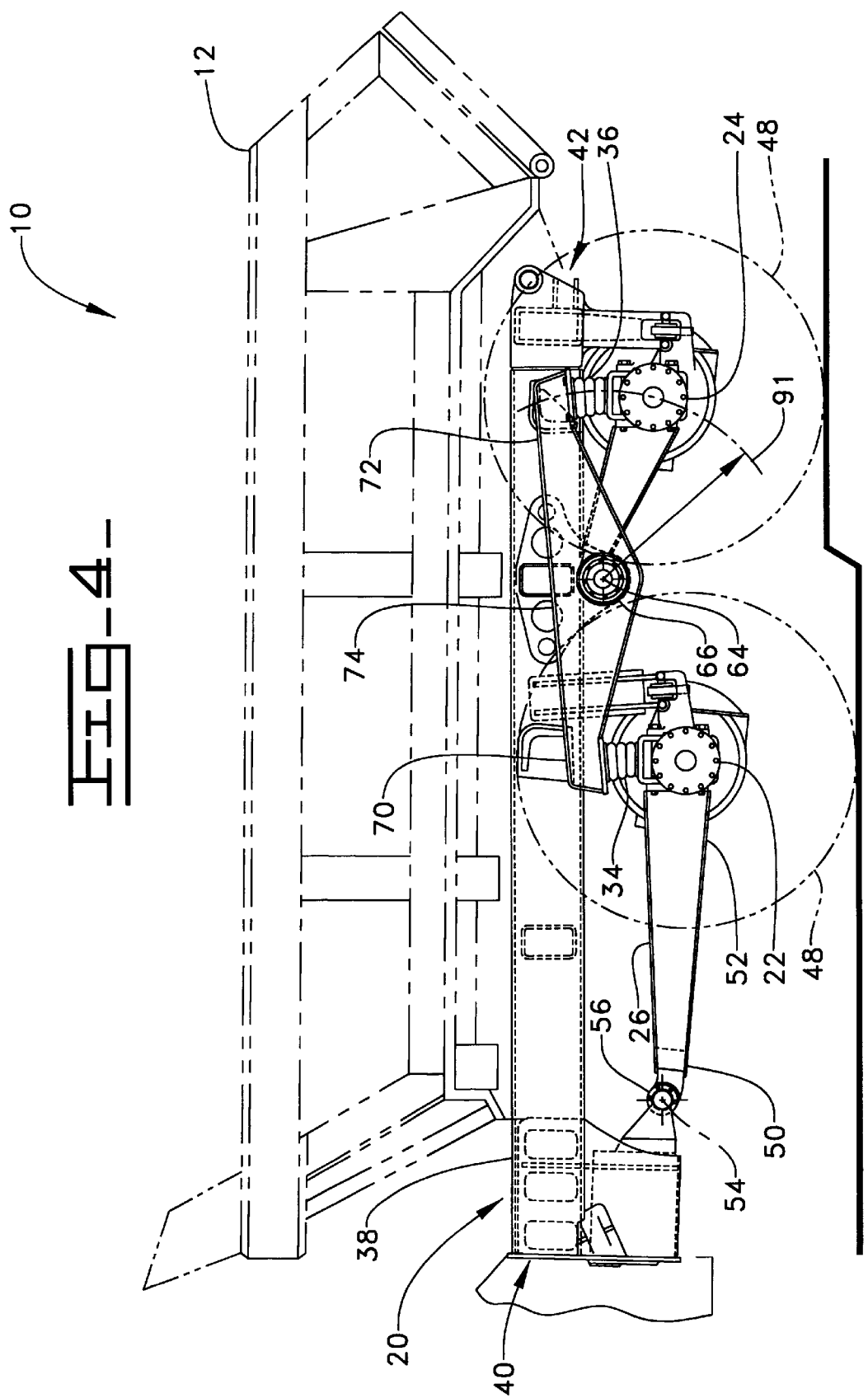
FIG. 4 is an enlarged diagrammatic longitudinal side view of a portion of the embodiment of FIG. 1 showing the rear axle assembly as the wheel in phantom traverses an obstacle.

As best seen in FIG. 4, an arcuate path 91 that the second end portions 72,82 of the balance beams 30,32 and the axis 25 of the second axle assembly 24 swing is also generally the same. In this application the predetermined location 64 that the pivotal connection of the first end portion 60 of the second suspension member 28 is connected to the frame 20 is within a circle of tolerance 92 of axis 90 as best seen in FIG. 3. The circle of tolerance 92 has a radius "R" in the range of between 15 mm to 55 mm. Ideally the radius "R" is less than 40 mm.

The pair of first flexible members 34 are preferably a rubber steel composite, but could be an air strut or other apparatus for cushioning load which are well known in the art. The pair of first flexible members 34 are positioned between and connected to the first axle assembly 22 and the first end portions 70,80 of the balance beams 30,32. Mounting of the pair of first flexible members 34 is accomplished by fasteners at a vertical distance "D1" above axis 23 in the range of 100 mm to 140 mm. Ideally the vertical distance "D1" is 120 mm.

The pair of second flexible members 36 are preferably a rubber steel composite, but could be an air strut or other apparatus for cushioning load which are well known in the art. The pair of second flexible members 36 are positioned between and connected to the second axle assembly 24 and the second end portions 72,82 of the balance beams 30,32. Mounting of the pair of second flexible members 36 is accomplished by fasteners at a vertical distance "D2" above axis 25 in the range of 100 mm to 140 mm. Ideally the vertical distance "D2" is 120 mm.

As seen in FIGS. 2 and 5 a pair of stabilizer bars 100 each having a first end 102 and a second end 104 is also included. The first ends 102 are pivotally connected to the frame 20, and are pivotally connected at the second end portions 104 to the second end portions 52,62 of the first and the second suspension members 26,28 respectively.

INDUSTRIAL APPLICABILITY

With reference to the drawings and in operation, the placement of the first pair and the second pair of flexible members 30,32 with respect to the axis 23,25 of the first and second axle assemblies 22,24, the predetermined locations 76,86 of the pivotal connections of the balance beams 30,32, and the predetermined location of the pivotal connection of the second suspension member reduces or optimizes the amount of shear realized by the first pair and the second pair of flexible members 30,32.

For example, as shown in FIG. 4 when a wheel 48 on the second axle assembly 24 traverses an obstacle. The shear encountered by the second pair of flexible members 36 is limited. This is accomplished by the second end portions 72,82 of the balance beams 30,32 and the axis 25 of the second axle assembly 24 generally swinging the same arcuate path 91.

As best seen in FIG. 6, when one wheel 48 of the first axle assembly 22 or the second axle assembly 24 encounters an obstacle, the first or the second axle assembly 22,24 rolls with respect to the first or the second balance beam 30,32. The pair of first and the pair of second flexible members 34,36 are connected to the first and the second axle assemblies 22,24 at a predetermined distance D1,D2 above a centerlines 23,25 of the axle assemblies 22,24 and are moveable in a lateral direction with respect to the balance beams 30,32 between a non-deflected and a deflected condition upon roll of the axle assemblies 22,24 about the pivotal connections of the first and the second suspension members 26,28. The predetermined location is adapted to limit the amount of deflection of the flexible members to an amount of less than about 52 mm.

Other aspects, objects and advantages of this invention can be obtained from a study of the drawings, the disclosure and the appended claims.

We claim:

1. A suspension system for a load carrying machine comprising:

a frame;

a first axle assembly;

a second axle assembly;

said first and second axle assemblies each defining an axis and being longitudinally spaced apart, each having opposite end portions being positioned transversely relative to said frame;

a first suspension member having a first end portion and a second end portion and being pivotally connected at the first end portion to the frame at a predetermined location on the frame and secured at the second end portion to the first axle assembly at a predetermined location;

a second suspension member having a first end portion and a second end portion and being pivotally connected at the first end portion to the frame at a predetermined location and secured at the second end portion to the second axle assembly at a predetermined location;

first and second balance beams each having a first end portion, a second end portion and a middle portion said balance beams being pivotally connected to the frame at a predetermined location between the first end portions and the second end portions of the balance beams, said predetermined location of the pivotal connection of the first end portion of the second suspension member and the predetermined locations of the pivotal connections of the balance beams each being below the frame generally along a common axis extending transversely relative to said frame;

a pair of first flexible members being positioned between and connected to the first axle assembly directly above the axis of the first axle assembly and the first end portions of the balance beams;

a pair of second flexible members being positioned between and connected to the second axle assembly directly above the axis of the second axle assembly and the second end portions of the balance beams; and a pair of stabilizer bars having a first end pivotally connected to the frame and a second end pivotally connected to the second end portions of the first and second suspension members.

2. The suspension system of claim 1, wherein the pivotal connections of the first and second suspension members being universal type connections.

3. The suspension system of claim 1, wherein the predetermined location of the pivotal connection of the first end portion of the second suspension member being within a circle of tolerance of the axis of the predetermined locations of the pivotal connections of the balance beams, said circle of tolerance being defined by a radius "R" having a range of 15 mm to 55 mm.

4. The suspension system of claim 3, wherein the radius "R" of the circle of tolerance being less than 40 mm.

5. The suspension system of claim 1, wherein the pair of first and the pair of second flexible members include a rubber steel composite.

6. The suspension system of claim 1, wherein the pair of first and the pair of second flexible members are moveable in a lateral direction with respect to the balance beams between a non-deflected and a deflected condition upon roll of the axle assemblies about the pivotal connections of the first and the second suspension members, said predetermined location being adapted to limit the amount of deflection of the flexible members to an amount of less than 52 mm.

7. The suspension system of claim 6 wherein the elevational distance between the centerline of the axle assemblies and the pair of first and the pair of second flexible members are mounted is in the range of 100 mm to 140 mm.

8. The suspension system of claim 1 wherein the second end potion of the balance beams and the center line of the second axle assembly each swing generally a common arcuate path.

* * * * *